United States Patent Office 3,111,396
Patented Nov. 19, 1963

3,111,396
METHOD OF MAKING A POROUS MATERIAL
Burton B. Ball, Norwood, Ohio, assignor to General Electric Company, a corporation of New York
No Drawing. Filed Dec. 14, 1960, Ser. No. 75,674
7 Claims. (Cl. 25—156)

This invention relates to a method of making a porous material and, more particularly, to a method of making a metal or metal compound foam.

Metal foams, which have been used as seals in rotating equipment, filters, insulation and the like, have been made by many known methods. One method involves intermixing a foamable resin and a metal or metal compound powder and then foaming the resin. The resin can then be heated at temperatures above its decomposition point resulting in a weakly joined foam structure which can then be sintered or otherwise further joined by heating at more elevated temperatures.

In all of the known methods, one problem was maintaining uniform density throughout the final product. Another problem was to find suitable foamable resin carriers which would result in a given pore size in the final product and yet carry the powder during the initial processing. Still another problem was providing a method for making a variety of densities of any particular material in a foamed condition so that designers could specify both density and material to fit a particular application.

The principal object of this invention is to provide a method for making a metal or metal compound foam material of a variety of densities, the foam being either flexible or rigid as desired and of a preselected pore size.

Another object is to provide a method for making porous materials of particular shapes, and uniform porosity predetermined by that of existing organic skeletal structures.

These and other objects and advantages will be recognized more readily from the following detailed description taken with the appended claims.

Briefly stated, this invention in one form comprises, in a method of making a foam material, the steps of impregnating a porous organic structure with a suspension of a powdered material in a fluid, slowly drying the impregnated organic structure, heating the impregnated organic structure to decompose the organic structure and the fluid while closely retaining the shape and size of the original organic structure, and then heating the impregnated carbon-powdered material structure to further join the powder into a continuous form.

There can be found in the literature, both patent and otherwise, a large variety of methods for making organic foams of many shapes and pore sizes. Some of the more recent patent literature includes U.S. Patents 2,772,245–2,772,246 and 2,798,054, Simon et al.; 2,786,038, Talalay; 2,797,443, Carlson, and 2,906,643, Dennis.

It has been found through the method of this invention that substantially any shaped porous article without size limitation except the capacity of available processing equipment, and of a large selection of pore sizes, pore structures, materials and strengths can be made by first making the desired size and shaped structure in an organic skeletal structure such as a foam or cloth of the type widely described in the literature and commercially available in many forms.

In a preferred form, the method of this invention includes selecting an organic structure in the form of a mesh, cloth or as a cured foamed structure such as open pore type polyurethane, polystyrene, cellulose or isocyanate sponge. A slurry is made of a liquid and a finely divided powder such as of a metal, metal oxide, or other metal compound. The slurry can include an organic binder, such as a synthetic resin, although such a binder is not essential in all cases as will be shown in detail later. However, it is desirable to include in the slurry a small amount of some type of decomposable agent such as a thickening agent, a metal hydride or a salt which will perform or provide for some binding action. The binding agent need not be foamable because although the method of this invention produces a foamed article, no foaming steps take place in the process. The slurry can be made with any liquid such as an organic solvent or with water.

The selected organic structure is then saturated with the slurry as thoroughly as possible. Excess slurry can then be removed from the pores or open portions, such as by squeezing, leaving only the matrix of the organic structure impregnated on its walls thoroughly coated with the slurry. One of the easier methods of accomplishing impregnation of the sponge or cloth structure is by soaking it in the liquid slurry (as a sponge in water) until it has been infiltrated with, or impregnated by the slurry. The impregnated "wet" organic structure is then squeezed between rolls to remove excess slurry and is slowly dried at or near room temperature. It is then subjected to a series of successively higher temperatures under a preselected protective or reactive atmosphere until the powder used in the original slurry fuzes or sinters or in some way joins to produce a bonded structure.

A broad example of these successively higher heating steps includes first heating to a temperature sufficient to reduce the organic cellular or porous structure and the liquid vehicle employed in the slurry substantially to carbon but below that temperature which would cause too rapid charring resulting in the destruction of the shape of the material or rupture of the internal structure. The material at this point in the process is a carbon structure, substantially all of the internal portions of which are at least coated with the powder of the original slurry. This structure is then heated to a second or intermediate temperature high enough to join the powder with at least a relatively weak bond as well as to assure full carbonization of the organic structure. The fully carbonized, weakly bonded structure is then heated at a third temperature sufficiently high to further join or sinter the powder into a foam product.

In most cases, it is desirable that the "heat treating" or "sintering" phase be carried out in a reducing atmosphere such as dry hydrogen. In the case of refractory materials, an inert atmosphere such as argon or helium can be used. Refractory metals such as W, Cb, Ta and the like require additional heat treatment which can be conducted in a vacuum. However, because of oxidation of metals at elevated temperatures, unless an oxide foam is desired, it is generally undesirable to conduct the higher temperature phases of the sintering or further joining process in air. A brief exposure is preferred at the maximum processing temperature after which the specimen is cooled under reducing or inert atmosphere and then removed from the protecting atmosphere.

As will be pointed out in more detail in the specific examples, virtually any size, shape, porosity or degree of ductility can be produced in a porous metal or metal alloy by a careful selection of materials used in the method of this invention. For example, the size, shape, number and condition of the pores of the organic porous structure or skeleton initially impregnated will govern many of the physical and mechanical characteristics of the final product. In addition, a careful choice of the powder to be placed into a slurry will govern in the type of matrix desired in the final article. Furthermore, a careful selection of a binding agent which can or cannot react with the powder can result in either a hard or soft, brittle or a ductile material as desired.

There are a great number of variations and combinations of metals, metal oxides, metal salts or other metal compounds including refractory materials which can be combined with a large number of organic structures with or without binders to result in a variety of types of foams, sheets, screens, etc. However, a significant feature of this invention is the use of an existing or precured organic structure of open pore type as a skeleton to control the type of the large variety of porous structures of low density possible through the method of this invention.

The vehicles, which with the powder forms the slurry, includes both binders and thinners. They carry the powder into the central portion of the skeletal organic structure and when necessary to hold the powders in place until a temporary bond is developed. When the vehicle is a material other than water it is preferable to use one which either depolymerizes or is decomposable to form a substantially pure carbon residue. In some instances only water is required as a vehicle because some metal compounds such as the salts contribute sufficient binding action themselves. Although the specific amounts are given for the binders and thinners in the following specific examples, it is to be understood that only that amount of thinner or binder is required to carry the desired amount of powder into the skeletal structure. With the more volatile thinners such as acetone, it is sometimes necessary to add, from time to time, thinner in addition to that originally specified in order to maintain the proper degree of slurry fluidity.

Binders which can be used in the vehicle include various resins such as silicones, epoxy, phenolic, gum cellulose gel, the methacrylates such as methyl methacrylate and those used in slip casting such as ammonium algenate, polyvinyl alcohol and the like. One binder which has been found particularly useful in that it does not react in any way with the powders but forms a high percentage of carbon in the structure is a colorless liquid corn sugar syrup. Such a syrup referred to hereafter as "sugar syrup" has a viscosity and surface tension which aids in the suspension of some of the higher density powders while providing sufficient carbon upon decomposition for a good carbon structure.

The following examples are merely exemplary of the wide variety of modifications and variations of which this invention is capable. They are meant to be illustrations of rather than limitations on the scope of this invention which is defined by the appended claims.

EXAMPLE 1

A slurry was made by thoroughly mixing 15% by weight of a methyl phenyl siloxane resin designated commercially by the Dow Corning Corporation as DC 2106 silicone resin with 70% by weight nickel powder (−325 mesh) and 15% by weight acetone.

A rectangularly shaped piece of polyurethane foam of open cell structure was impregnated with the slurry by soaking and repeatedly alternatively squeezing and relaxing the polyurethane foam until substantially thorough impregnation had been effected. This impregnated skeletal structure was slowly dried in air at room temperature for about 18 hours to assure slow solvent removal in order to keep the powder of the slurry in place. Although air drying was used in this example, low temperature oven drying can be used as well. The dried rectangular impregnated shape was tack-free even though the silicone resin alone would normally remain relatively sticky at room temperature for long periods of time. In drying relatively thick sections of material, it has been found necessary to use some type of forced air flow to insure that the central portions of the body are thoroughly dried.

The fully dried body was then placed in a metal retort the air atmosphere of which was purged and replaced with a hydrogen atmosphere. The retort was then heated to 600° F. and held for one half hour to char or carbonize the majority of the organic sponge. The temperature of the retort was then raised to 800° F. and held for one hour to assure complete carbonization of all organic materials and to weakly bond the powders. The retort temperature was then increased to 2200° F. at a rate of about 400° F. per hour and held at 2200° F. for four hours to remove the carbon from the structure and to sinter the powders. The retort was then cooled to 400° F. before removing the nickel foam product from the protective atmosphere. The hydrogen atmosphere was maintained at all times during the cooling process in order to avoid oxidation of the specimen.

There appear to be essentially four chemical reactions and one physical action which occur during the heating cycle to form a metallic article in the retort. The chemical reactions are (1) decomposition or depolymerization of the vehicle employed to form the slurry; (2) decomposition or depolymerization of the foamed organic "skeleton"; (3) oxidation and removal of the carbonaceous residue formed by the organic materials; and (4) reduction of any oxide on the metal or decomposition of metal salts to form the pure metal. The mechanical step is the sintering of the metal or further joining other powders in other examples to produce a foamed product. It appears that the most critical of these five occurrences is the oxidation and removal of carbonaceous residue formed by the organic materials. It is this reaction which makes the preparation of certain foamed materials, particularly columbium, difficult because their affinity for carbon presents the possibility of forming carbides which can be undesirable.

It is believed that the oxidation and removal of carbon is substantially completed before reduction of any oxide because, as will be pointed out in the subsequent examples, moisture such as in the form of steam can be introduced into the hydrogen to form wet hydrogen during the early stages of the heat treatment in order to enhance carbon removal by oxidation and to result in a product the matrix of which appears to be more uniform than the product formed without steam. When the atmosphere of wet hydrogen is used in the early stages of heat treatment, it is replaced by dry hydrogen after the sintering temperature has been reached. When a silicone resin is used in the vehicle, the organic portion of the molecule decomposes to form carbon which is subsequently oxidized and leaves behind a silicon containing residue. Residues of this type can react with the metal powder to effect the properties of the end product.

The product of this example was a nickel foam of essentially the same size, shape, pore structure and pore arrangement as the polyurethane foam originally impregnated with the slurry. However, because of the reaction of the residue from the silicone resin with the nickel, the foam was harder and slightly more brittle than the product which resulted from the following Example 2.

EXAMPLE 2

A slurry was made by thoroughly mixing 70% by weight nickel powder (−325 mesh), 15% by weight of a corn sugar syrup sold commercially by the Corn Products Company as "Karo" syrup and 15% by weight water. The method of Example 1 was repeated to produce a nickel foam of essentially the same size, shape, pore structure and pore arrangement as the original polyurethane skeletal material but more ductile and flexible than the product of Example 1.

EXAMPLE 3

A piece of cotton cheese cloth, commercially designated as grade 80, was impregnated with the slurry of Example 2 and was processed according to the method described in Example 1. The resulting product was a ductile, relatively flexible nickel screen of the shape, size and opening structure of the original impregnated cheese cloth.

EXAMPLE 4

A shaped zirconium oxide foam was made by first impregnating a plurality of ⅛ inch thick sheets of polyurethane foam with a slurry of two parts by weight of zirconium oxide to one part by weight of silicone resin DC 2106. Sufficient acetone was added to make a slurry. The impregnated polyurethane foam sheets, some of which were of different sizes to facilitate formation of an irregular shape, were clamped in intimate contact around a graphite mandrel and allowed to dry in air at room temperature for about 16 hours. The dried impregnated foamed shape still secured to the mandrel was then heated in a forced convection air oven at 450° F. for five hours to char the polyurethane foam and the organic ingredients in the slurry. The foam was removed from the mandrel and placed in a retort, the air atmosphere of which was replaced by hydrogen which had been passed through a steam chamber to form "wet" hydrogen. The retort was placed in a furnace at 400° F. and the temperature was increased to 900° F. The retort was held at 900° F. for one hour to assure full carbonization of the polyurethane and the organic ingredients of the slurry and to preliminarily bond the $ZrO_2$ after which the furnace was turned up to 2000° F. When the retort temperature had reached 2000° F. (about two hours) the steam was turned off and dry (about —100° F. dew point) hydrogen was passed into the retort to replace the "wet" hydrogen. The retort was held for one hour at 2000° F. after which it was allowed to cool. The material which resulted from this treatment was a zirconium oxide foam of the shape, size and pore characteristics of the original polyurethane foam.

The zirconium oxide shape was placed in a kiln and fired in air at about 3000° F. for about two hours in order to more securely bond the structure of the foam.

In other work with $ZrO_2$ it was found that when the previously described sugar syrup was substituted for the silicone resin of this example, it was not necessary to increase the retort temperature to 2000° F. A temperature of 1400° F. was found to be adequate after which the article was removed from the retort and then fired in an air kiln for two hours at 3000° F.

EXAMPLE 5

Through the use of reducible or decomposable compounds of metals, a foam's matrix appears to be more uniform and complete although the external shape of the foam and its pore structure is essentially the same as that made directly from the metal powder.

For example, a slurry was made by mixing 70 weight percent nickel oxide (green NiO) of —325 mesh, with 15 weight percent sugar syrup and 15 weight percent water. A piece of polyurethane foam was impregnated and treated according to the method of Example 1 to produce a nickel foam having a more uniform matrix than that of either Example 1 or Example 2.

EXAMPLE 6

A copper foam having a density of about 0.012 pound per cubic inch was made by first making a slurry of 62.4 weight percent copper oxide powder (red CuO), 18.8 weight percent of a silicone modified phenolic resin commercially designated by Cincinnati Testing Laboratories, Inc., as 37–9X resin, and 18.8 weight percent acetone. A piece of polyurethane foam was impregnated with the slurry and was air dried slowly as in the previous examples. It was then placed in an oven and slowly heated to 520° F. by holding for thirty minutes at each of the temperatures 200° F., 350° F., 375° F. and 400° F. After holding in the oven at 520° F. for about 14 hours, the charred impregnated foam was placed in a hydrogen atmosphere retort and heat treated in the manner described in Example 1 except that the maximum heating temperature in this case was 1900° F. In this example, the "wet" hydrogen method described in Example 4 above was used by introducing wet hydrogen into the retort until 1900° F. was reached at which time the "wet" hydrogen was replaced with dry hydrogen to reduce the copper oxide to copper.

EXAMPLE 7

A nickel base alloy comprising nominally by weight 0.1% C, 22% Cr, 1.5% Co, 9% Mo, 0.6% W, 18.5% Fe, with the balance essentially nickel and small concentrations of impurities was made into —325 mesh powder. The powder was heated slowly in air at 2000° F. and held at that temperature for 16 hours to form an oxide of the alloy.

A slurry was made from 62.5 weight percent of the above nickel base alloy oxide, 12.5 weight percent sugar syrup and 25 weight percent water. After impregnating and processing according to the method described in Example 1, there resulted a metal foam of essentially the same shape, size and pore structure as the original impregnated organic foam but having a matrix of the original unoxidized powdered nickel base alloy.

EXAMPLE 8

A graphite foam was made by impregnating a polyurethane foam with a graphite-silicone slurry of the following proportions by weight: 42.5% pulverized natural graphite, 42.5% silicone resin DC 2106 and 15% acetone. The impregnated foam was air dried at 300° F. for about 15 hours and was then heated in air at about 400° F. to char the foam. No additional heat treatment is required unless the graphite is to be used at elevated temperatures in which case the graphite foam can be further stabilized by heating at its intended operating temperature.

EXAMPLE 9

A tungsten-nickel foam was made by following the method of Example 1 and using a slurry including, by weight, 60.6% W—$NiCl_2$ powder mix (59.4% W and 1.2% $NiCl_2$), 12.1% sugar syrup and 27.3% water. Best results were obtained through the use of the above described "wet" hydrogen process. The charred foam was heated to about 1700° F. to presinter, followed by a 16 hour sintering at about 2200° F. The tungsten-nickel foam was further bonded by heating in a 4200° F. vacuum furnace for ½ hour.

EXAMPLE 10

Although it is generally desirable to use a binder in the original slurry, it has been found that this is not always necessary. For example, a Cr—Ni foam was made by first impregnating a polyurethane foam with a slurry comprising 85% Cr—$NiCl_2$ powder mix (70.8% Cr and 14.2% $NiCl_2$) with the balance water. The impregnated sponge was slowly oven dried at about 200° F. for about 15 hours after which the oven temperature was increased slowly to 400° F. and held for about four hours to slowly char or carbonize the polyurethane foam. The charred foam was then placed in a retort and the retort heat treatment as described in Example 1 was then followed up to a sintering temperature of 2200° F. The product was a CrNi foam having a physical structure the same as that of the original polyurethane organic foam.

EXAMPLE 11

An isocynate plastic sponge was impregnated with a slurry consisting, by weight, of 71.8% (255 grams) of —325 mesh nickel powder, 0.4% (1.25 grams) of ammonium algenate, 0.1% (0.5 gram) of polyvinyl alcohol, and 27.7% (98.25 grams) of water. The impregnated sponge was dried over night in an infra-red oven at about 175° F. and then placed in a hydrogen atmosphere retort. The retort was heated in dry hydrogen for one hour at 700° F. after which the temperature was increased to 2250° F. and held for about 2 hours. In this case, as can be the case with other materials, a second sinter cycle can be conducted at a slightly higher temperautre depending on the melting point of the powder to improve the bond strength of the metal foam. In this case a second sinter between 2400–2450° F. was found to improve the bond strength. The advantage in using this example's type of binder, which are commonly used in slip cast powder metallurgy, is that these binders hold the metal powder in place while a relatively low temperature bond occurs between the powders. However they are completely decomposed at the higher sintering temperatures so that no alloying with the metal powder takes place as in the case of silicone resins and no carbon residue remains as in the case of resins such as phenolic or epoxy and the like or of high carbon bearing compounds such as sugar syrup. Because of the small amounts of materials required, it can be more economical to use the types of binders of this example in water solutions rather than the resins, sugar solutions, etc. of other examples.

EXAMPLE 12

A silicon nitride foam was made by following the impregnation and drying method as described in Example 1 using a slurry consisting of, by weight, 71.4% $Si_3N_4$ powder, 14.3% silicone resin DC 2106 and 14.3% acetone. In this example the fully dried impregnated foam was placed in an oven which was then heated to about 450° F. and held for about ½ hour to char the majority of the organic sponge. The charred impregnated material was then placed into a retort in which steam (without hydrogen) was introduced. The retort temperature was raised to about 800° F. where it was held for about one hour after which the retort temperature was increased to 2100° F. where it was held for about one hour to further bond the silicon nitride into a continuous foam.

EXAMPLE 13

The method as described in Example 12 was repeated except that $Al_2O_3$ powder was substituted for the $Si_3N_4$ powder in the slurry to result in a continuous alumina foam.

EXAMPLE 14

Tungsten foam was made by following the method of Example 1 with the use of "wet" hydrogen as described in Example 4. A slurry of the following composition, by weight, was used: 73.1% tungsten powder (88 microns), 3.8% $WCl_6$ powder, 15.4% sugar syrup and 7.7% water. After sintering at 2150° F. in dry hydrogen, the tungsten foam was further bonded by heating in a 4200° F. vacuum furnace for ½ hour. The resulting product was a continuous tightly bonded tungsten foam.

EXAMPLE 15

The method of Example 14 was repeated with a slurry consisting of, by weight, 75.3% W powder, 0.8% Re powder, 0.8% Ni powder, 15.4% sugar syrup and 7.7% water to result in a tungsten alloy foam.

From the above examples it is evident that a wide variety of combinations of resins, thinners and powders of metals and metal compounds such as metal oxides and metal salts can be used to produce a foam or porous shape from that powder through the use of a precured or existing organic, decomposable structure. The following table includes a representative sample of the wide variety of other foams which have been prepared according to the method of this invention. Because the thinner in the slurry merely acts as part of the vehicle to carry the powder into place, the following table gives a powder to binder ratio which has been found to be preferred in the practice of this invention:

*Table of Additional Examples*

[Percent and parts by weight]

| Powder, Total percent | | Binder, percent | | Thinner, percent | Parts Powder Per 1 Part Binder |
|---|---|---|---|---|---|
| Ni | 71.5 | Silicone | 7.1 | A 21.4 | 10.0 |
| Ni | 62.6 | do | 18.7 | A 18.7 | 3.4 |
| Ni | 55.5 | do | 27.8 | A 16.7 | 2.0 |
| Ni | 66.7 | Phenolic | 20.0 | A 13.3 | 3.3 |
| Ni | 71.5 | Epoxy | 21.4 | A 7.1 | 3.3 |
| Ni | 66.7 | Silicone | 13.3 | T 20 | 5.0 |
| Ni | 62.5 | Sugar Syrup | 12.5 | W 25 | 5.0 |
| Ni | 66.7 | do | 20.0 | W 13.3 | 3.3 |
| Ni | 77.0 | do | 7.7 | W 15.3 | 10.0 |
| NiO | 63.0 | do | 19.0 | W 18 | 3.3 |
| NiO (70.) / $NiCO_3$(1.4) | 71.4 | do | 14.3 | W 14.3 | 5.0 |
| $NiCO_3$ | 71.4 | do | 14.3 | W 14.3 | 5.0 |
| W (59.4) / $NiCl_2$(1.2) | 60.6 | do | 12.1 | W 27.3 | 5.0 |
| W (59.4) / NiO (1.2) | 60.6 | do | 12.1 | W 27.3 | 5.0 |
| $WO_2$ (60.1) / NiO (0.6) | 60.6 | do | 12.1 | W 27.3 | 5.0 |
| Cu | 58.8 | do | 17.7 | W 23.5 | 3.3 |
| $CuCl_2$ | 58.9 | do | 17.6 | W 23.5 | 3.3 |
| Graphite | 42.5 | do | 42.5 | W 15 | 1.0 |
| Ag | 71.5 | do | 21.4 | W 7.1 | 3.3 |
| Pt | 65 | do | 6 | W 29 | 11.0 |
| W | 77 | Epoxy | 15.3 | A 7.7 | 5.0 |
| Cr (70.8) / $NiCl_2$(14.2) | 85.0 | None | | W 15.0 | |
| $NiCl_2$ | 66.7 | do | | W 33.3 | |
| NiO (82.7) / $NiCl_2$(5.8) | 88.5 | do | | W 11.5 | |
| $CeO_2$ | 56.7 | Silicone | 28.3 | A 15 | 2.0 |
| $CeO_2$ | 45.4 | do | 18.2 | A 36.4 | 2.5 |
| $ZrO_2$ | 56.7 | do | 28.3 | A 15 | 2.0 |
| Pb | 71.4 | do | 14.3 | A 14.3 | 5.0 |
| PbO | 62.5 | do | 12.5 | A 25.0 | 5.0 |
| Ta | 77.0 | Sugar Syrup | 15.3 | W 7.7 | 5.0 |

Thinner key: A=acetone; T=toluene; W=water.

From the above table, it can be seen that a preferred range of powder is 1–11 parts to 1 part of binder and that the preferred composition range of the slurry consists of, by weight, 42.5–88.5% powder, 6–42.5% binder (when a separate binder is used) and about 7–36% of a thinner. In the examples given in the above table, the organic skeletal or porous organic material used included existing foams of polyurethane, cellulose, isocyanate, and polystyrene each of which give slightly different physical characteristics to the final product, as well as cotton cheese cloth and masses of unwoven cotton fibers. In the column referring to binders in the above table, the silicone and sugar syrup binders were the same as those described in the preceding examples. The phenolic binders were either 91 LD phenolic or 37–9X silicone modified phenolic marketed by the Cincinnati Testing Laboratories, Inc. The epoxy resin binder was that marketed by the Shell Chemical Company as number 828 Epon resin.

The foamed materials prepared according to the method of this invention have densities as low as 0.004 pound per cubic inch with the maximum density depending on the degree of porosity and the type of slurry originally used to impregnate the organic foam. The range which has been found to be preferred lies between about 0.008–0.03 pound per cubic inch.

When properly prepared, particularly with regard to impregnation of the skeletal organic foam and removal of excess slurry, the resulting foamed material is quite uniform in both cell size and distribution. Many of the foamed metals and metal alloys are compressible so that the density in weight per unit volume can be increased by appropriately compressing the material. This is particularly true of copper, nickel and the nickel base alloys which can be made ductile by avoiding binders which react to form brittle intermetallics.

In the case of some of the lower density materials such as the nickel foam of 0.008 pound per cubic inch, it is possible to see light through specimens up to about ⅝ or ¾ inch thick. Because of the continuous or open cellular structure, gases are readily transmitted through the foamed materials of this invention, and therefore these foams are capable of being used as filters, catalysts or catalyst carrying media and the like.

A variety of foamed material shapes can be readily produced through the practice of this invention. One example is the fine mesh wire grid described in the Example 3 above. Other shapes can be made by shaping the original organic foam, prior to impregnation, such as by "hot wire" cutting. Still another method for shaping the organic foam includes soaking the sponge in water, freezing, shaping or cutting to any desired configuration, thawing and drying prior to impregnating the newly shaped sponge with the slurry in the first steps of the method of this invention. Once formed, the product resulting from the method of this invention can itself be used as a strong shaped skeleton and can itself be impregnated with other materials such as plastics for such use as ablative cooling.

Although this invention has been described in connection with specific examples, it can be readily recognized that the invention is capable of a wide variety of modifications and variations within the broad scope of the invention.

What is claimed is:

1. In a method of making a porous material, the steps of: impregnating a porous organic structure with a suspension of a powdered material in a fluid; slowly drying the impregnated organic structure; heating the impregnated organic structure to decompose the organic structure and the fluid while closely retaining the shape and size of the original organic structure; and then heating the remaining carbon-powdered material structure to further join the powder into a porous material.

2. A method of making a porous material comprising the steps of: suspending in a fluid a powder selected from the group consisting of metals, metal alloys and metal compounds; impregnating a porous organic structure with the fluid suspension, slowly drying the impregnated organic structure; heating the impregnated organic structure at a first temperature sufficient to reduce the organic structure substantially to carbon while retaining the shape and size of the original organic structure; heating the remaining carbon-powder structure at a second temperature to join the powder weakly together; and then heating the carbon structure at a third temperature to remove the carbon and to further join the powder into a porous material.

3. A method for making a porous material comprising the steps of: making a liquid suspension of a powder selected from the group consisting of metals, metal alloys and metal compounds, a binder and a thinner, the powder to binder ratio being in the range of 1–11 parts of powder to 1 part of binder; impregnating a porous organic structure with the suspension; slowly drying the suspension at a temperature below the charring temperature of the organic structure; heating the impregnated organic structure at a first temperature sufficient to reduce the organic structure substantially to carbon but below that temperature which would cause rapid charring resulting in rupture of the shape and internal structure of the material; and then heating the carbon-powder structure at a temperature sufficiently high to sinter the powder into a porous product.

4. A method for making a porous material comprising the steps of: making a liquid slurry of a powder selected from the group consisting of metals, metal alloys and metal compounds, a binder and a thinner, the powder to binder ratio being in the range of 1–11 parts of powder to 1 part of binder; impregnating a porous organic structure with the slurry; slowly drying the slurry at a temperature below the charring temperature of the organic structure; heating the impregnated organic structure at a first temperature sufficient to reduce the organic structure substantially to carbon but below that temperature which would cause rapid charring resulting in rupture of the shape and internal structure of the material; heating the carbon-powder structure to an intermediate temperature high enough to join the powder with at least a relatively weak bond; and then heating to a temperature sufficiently high to sinter the powder into a porous product.

5. A method for making a porous material comprising the steps of: making a liquid slurry of a powder selected from the group consisting of metals, metal alloys and metal compounds, a binder and a thinner, the powder to binder ratio being in the range of 1–11 parts of powder per 1 part of binder; impregnating a porous organic structure with the slurry; slowly drying the impregnated organic structure; heating the dry organic structure to a temperature sufficient to reduce the organic structure substantially to carbon but below that temperature which would cause rapid charring and rupture of the structure; heating the carbon-powder impregnated structure in a wet reducing atmosphere from the charring temperature to a sintering temperature; and then heating the material in dry hydrogen at the sintering temperature to form a porous product.

6. A method for making a porous material comprising the steps of: making a liquid slurry of a powder selected from the group consisting of metals, metal alloys, and metal compounds, a binder and a thinner, the powder in the slurry being 42.5–88.5% by weight of the slurry; impregnating a polyurethane porous structure with the slurry; slowly drying the impregnated polyurethane porous structure; heating the structure at about 300–500° F. to char the polyurethane material; heating the charred structure at about 500–800° F. to further char any organic ingredients in the impregnated structure; and then heating in a protective atmosphere at an elevated temperature sufficient to bond the powders into a porous structure.

7. A porous material consisting essentially of heat bonded powdered material selected from the group consisting of metals, metal alloys and metal compounds, said porous material being made in accordance with the method of claim 1.

References Cited in the file of this patent

UNITED STATES PATENTS

| 2,819,209 | Pall et al. | Jan. 7, 1958 |
| 2,977,265 | Forsberg et al. | Mar. 28, 1961 |
| 2,979,400 | Mouwen | Apr. 11, 1961 |

OTHER REFERENCES

"Meet Foamed Aluminum," Chem. & Engr. News, July 29, 1957, p. 56 (available Patent Office Technical Library).